Aug. 26, 1947.  F. J. STADLER  2,426,286
DENTAL X-RAY FILM IDENTIFIER
Filed Jan. 18, 1945
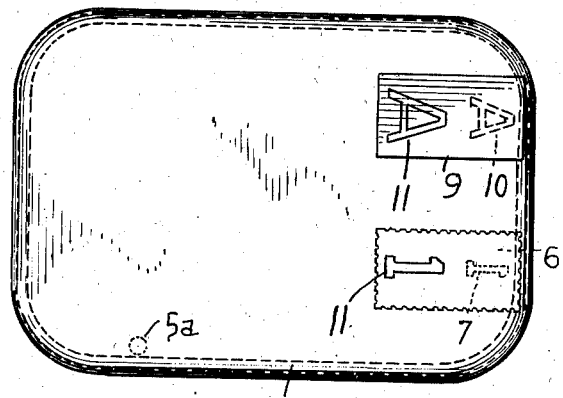
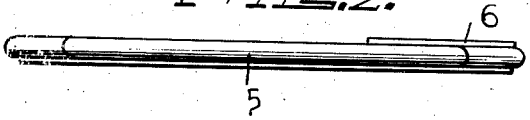
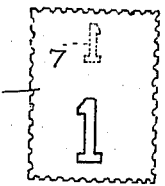
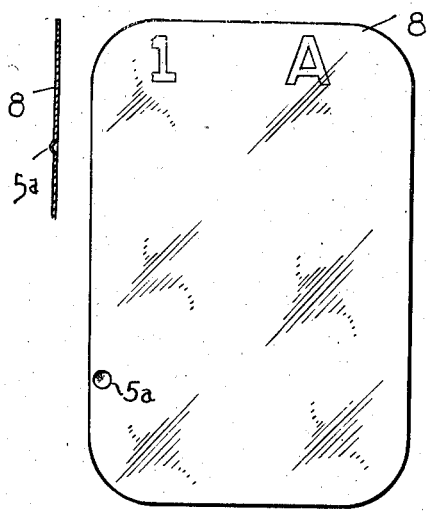
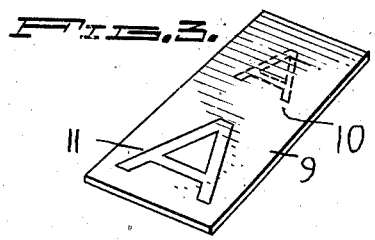
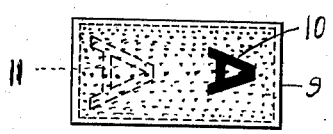
INVENTOR.
FRANK J. STADLER,
BY
Carl Miller
ATTORNEY.

Patented Aug. 26, 1947

2,426,286

UNITED STATES PATENT OFFICE 2,426,286

DENTAL X-RAY FILM IDENTIFIER

Frank J. Stadler, New York, N. Y.

Application January 18, 1945, Serial No. 573,369

2 Claims. (Cl. 250—67)

This invention relates to means for identifying dental X-ray films, so that a dentist can properly record the name of the patient associated with the picture taken, and the exposed dental film will always carry an identifying key, by means of which the film may be properly credited to the right patient, and the picture on the film may be read in correct order, so as to avoid confusing an area on the right side of the patient's mouth, with a corresponding area on the left side of the patient's mouth.

One of the objects of the invention is the provision of a dental film identifying means, which can be applied to any dental film packet, and which will cause the X-rays to impress upon the dental film the identifying symbol or character carried by the identifying means.

Another object of the invention is the provision of a system of individual labels or strips, each carrying a distinct symbol or identifying character, which may be an alphabetic letter or character, or a numeral or other character, disposed thereon in negative form for printing upon the dental film, and another and similar character or symbol which is printed or disposed in positive reading order, which will enable any dentist to quickly identify a film packet, but which positive character or letter is not printed on the dental film.

With the above and other objects in view the invention consists in certain new and useful constructions, combinations, and arrangements of parts, clearly described in the following specification, and fully illustrated in the accompanying drawings, in which:

Fig. 1 is a plan view of a dental film packet, showing two identifying labels applied thereto.

Fig. 2 is an edge view thereof.

Fig. 3 is a detail perspective view of one of the labels.

Fig. 4 is a plan view thereof, slightly modified.

Fig. 5 is a plan view of a developed dental film.

Fig. 6 is a plan view of a sheet having a group of consecutively numbered detachable sections, each forming an identifier for a dental film.

Fig. 7 is a detail plan view of one of the sections.

Fig. 8 is an end view of a roll, having a series of detachable sections, each forming a film identifier.

Fig. 9 is a detail vertical sectional view through the dental film.

Referring to the accompanying drawings, 5 designates a film packet of the type which is conventionally used for making dental X-ray pictures. This film packet is inserted in the mouth of the patient and exposure is made with X-rays, while the dental film is wholly enclosed in the packet. When the dental film is removed from the packet it is important that the dentist be able to positively credit the dental picture to the right patient, and to the correct dental area of his or her mouth.

To avoid errors in assigning any dental film, after exposure to the wrong patient, and errors arising from incorrectly reading the developed exposed dental film, which frequently result in locating the seat of dental infection on the wrong side of the mouth of the patient, I provide a label or attaching layer or sheet 6, which may be made of paper, composition, or plastic, like Cellophane or the like, and which is provided with an inner side coated with a suitable adhesive.

This label or sheet 6 is provided with an identifying symbol, character or letter 7, which is preferably disposed in a negative reading form, so that it will print in the positive upon the dental film 8, when exposed to X-rays. Another and similar sheet or label 9, having a different identifying character or numeral 10 thereon, may also be attached to the same side of the dental film packet.

The character or letter 7, and the character or numeral 10, are printed in metallic ink, or may consist of stamped out letter or numeral forms, of metal foil, which are permanently attached to the sheet.

The film packet 5 is provided with the usual indentation 5a, which is also impressed upon the edge of the dental film 8, and which provides means for establishing the positive and negative faces of the film.

Each sheet is also provided with a character or symbol 11, corresponding to the film identifying symbol or character of the sheet, but which is not printed in ink which will cause the matching character or symbol to be printed on the dental film, when it is exposed to the X-rays in taking a picture of a dental area of the patient's mouth.

When the dental film is removed from the film packet the identifying character or symbol of the sheet or sheets applied to the film packet, which are printed in metallic ink or appear in cut out metal forms, will be printed directly on the adjacent edge of the dental film, as shown in Fig. 5. By determining the side of the film which shows the identifying letter or symbol, or letters or symbols, in positive reading form, the correct position of the dental picture may be established.

In all cases the identifier appears in reverse or negative form on the attached sheet or label, while the associated identifier or symbol, which does not function to print an identifying mark or symbol on the dental film, is printed by ink which is neutral to the action of the X-rays, and appears in positive reading order, so that any dental office clerk can identify the film packet for purpose of properly listing it.

It is understood that various changes and modifications may be made in the details of construction, their combination and arrangement, within the limits of the claims of this application.

Having described my invention I claim as new:

1. In a label identifier for dental X-ray films, consisting of a sheet of continuous material having an identifying character in X-ray transparent material on one side of said sheet, the feature which consists in having a similar but X-ray opaque character in reverse reading on the other or obverse side of said sheet.

2. A label X-ray film identifier according to claim 1, wherein the X-ray transparent character occupies a different area than that occupied by the X-ray opaque character.

FRANK J. STADLER.

REFERENCES CITED

The following references are of record in the file of this patent:

UNITED STATES PATENTS

| Number | Name | Date |
|---|---|---|
| 2,390,397 | Stadler | Dec. 4, 1945 |
| 1,922,823 | Sawford | Aug. 15, 1933 |
| 1,840,908 | Lozier et al. | Jan. 12, 1932 |

FOREIGN PATENTS

| Number | Country | Date |
|---|---|---|
| 447,301 | Great Britain | May 15, 1936 |